United States Patent
Pettersson

(10) Patent No.: US 12,480,609 B2
(45) Date of Patent: Nov. 25, 2025

(54) SYSTEM AND METHOD FOR CENTRALIZING A QUICK CONNECT NIPPLE

(71) Applicant: CEJN AB, Skovde (SE)

(72) Inventor: Emil Pettersson, Skovde (SE)

(73) Assignee: CEJN AB, Skövde (SE)

( * ) Notice: Subject to any disclaimer, the term of this patent is extended or adjusted under 35 U.S.C. 154(b) by 0 days.

(21) Appl. No.: 18/843,951

(22) PCT Filed: Mar. 2, 2023

(86) PCT No.: PCT/EP2023/055372
§ 371 (c)(1),
(2) Date: Sep. 4, 2024

(87) PCT Pub. No.: WO2023/166148
PCT Pub. Date: Sep. 7, 2023

(65) Prior Publication Data
US 2025/0109814 A1   Apr. 3, 2025

(30) Foreign Application Priority Data
Mar. 4, 2022   (GB) ...................................... 2203004

(51) Int. Cl.
*F16L 37/52*   (2006.01)
*F16L 29/04*   (2006.01)
(Continued)

(52) U.S. Cl.
CPC ............... *F16L 37/52* (2013.01); *F16L 29/04* (2013.01); *F16L 37/32* (2013.01); *F16L 37/38* (2013.01)

(58) Field of Classification Search
CPC . F16L 37/52; F16L 29/04; F16L 29/02; F16L 37/32; F16L 37/38
See application file for complete search history.

(56) References Cited

U.S. PATENT DOCUMENTS

| | | | | |
|---|---|---|---|---|
| 3,645,294 | A | * | 2/1972 | Allread ................... F16L 37/34 137/614 |
| 4,886,301 | A | * | 12/1989 | Remsburg ............... F16L 37/56 285/39 |

(Continued)

FOREIGN PATENT DOCUMENTS

| | | | | |
|---|---|---|---|---|
| GB | 2068489 | A | * | 8/1981 ............ F16L 27/073 |
| WO | 2022031918 | A1 | | 2/2022 |

OTHER PUBLICATIONS

International Search Report and Written Opinion from PCT/EP2023/055372, dated Apr. 11, 2023.

*Primary Examiner* — David Colon-Morales
(74) *Attorney, Agent, or Firm* — Kevin E. West; Advent, LLP

(57) ABSTRACT

A system for centralizing a quick connect coupling is disclosed. The system comprises a housing; a quick connect coupling comprising a first circumferential part cone-shaped surface; and a hose connection, comprising a second circumferential part cone-shaped surface. The system comprises a first centralizing ring having a third circumferential part cone-shaped surface engaging the first circumferential part cone-shaped surface of the quick connect coupling; and a second centralizing ring having a surface engaging with the second circumferential part cone-shaped surface of the hose connection. The system comprises a spring forcing the third circumferential part cone-shaped surface of the first centralizing ring and the first circumferential part cone-shaped surface of the quick connect coupling, against each other, and forcing the surface of the second centralizing ring and the second circumferential part cone-shaped surface of the hose connection against each other.

20 Claims, 5 Drawing Sheets

(51) Int. Cl.
  *F16L 37/32* (2006.01)
  *F16L 37/38* (2006.01)

(56) References Cited

U.S. PATENT DOCUMENTS

| | | | | |
|---|---|---|---|---|
| 5,322,330 | A * | 6/1994 | Remsburg | F16L 37/56 |
| | | | | 285/39 |
| 7,413,161 | B2 * | 8/2008 | Arosio | F16L 37/413 |
| | | | | 251/149.6 |
| 8,028,718 | B2 * | 10/2011 | Tiberghien | F16L 29/04 |
| | | | | 251/149.6 |
| 9,351,428 | B2 * | 5/2016 | Eckberg | F16L 37/34 |
| 10,288,198 | B2 * | 5/2019 | Tiberghien | H05K 7/20272 |
| 11,359,753 | B2 * | 6/2022 | Raad | F16L 37/52 |
| 11,619,334 | B2 * | 4/2023 | Langer | F16L 37/0841 |
| | | | | 285/66 |
| 11,746,942 | B2 * | 9/2023 | Durieux | F16L 37/56 |
| | | | | 251/149.6 |
| 11,815,214 | B2 * | 11/2023 | Nick | H05K 7/20781 |
| 12,044,338 | B2 * | 7/2024 | Durieux | F16L 27/00 |
| 12,173,826 | B2 * | 12/2024 | Shende | F16L 37/34 |
| 2023/0143344 | A1 * | 5/2023 | Marquis | F16L 37/52 |
| | | | | 285/261 |
| 2023/0184363 | A1 * | 6/2023 | Marquis | F16L 37/04 |
| | | | | 285/261 |

* cited by examiner

SYSTEM AND METHOD FOR CENTRALIZING A QUICK CONNECT NIPPLE

TECHNICAL FIELD

The present disclosure relates to a system and method for centralizing a quick connect nipple or a quick connect coupling and a method of assembling the same. More particularly, the present disclosure relates to a system and method for centralizing, aligning, and floating a quick connect nipple or a quick connect coupling, with respect to its housing, and a method of assembling the same.

BACKGROUND

A nipple, the male member, must be aligned with the coupling, the female member when a connection between the two is made. After a disconnection the nipple and the coupling may be misaligned. This leads to wear of the parts, leaking connections, and even makes connection impossible. It is desirable that the nipple and coupling can align to be concentric during connection and that the nipple and coupling are re-centred after a disconnection.

A further technical problem is that any nipple or coupling must fit and work together with already existing connections and parts. It is desirable that any solution is simple, not expensive to produce, is reliable, and can take up forces created during connection. It is further a technical problem to avoid cumbersome arrangements that are time consuming or expensive to manufacture or assemble.

SUMMARY

The present disclosure is directed to a system and a method for centralizing a quick connect nipple, the male portion of a connector, or a quick connect coupling, the female portion of the connector.

According to one embodiment, a system for centralizing a quick connect nipple or a quick connect coupling is disclosed. The system comprises a housing; a quick connect nipple, or a quick connect coupling, each comprising a first circumferential part cone-shaped surface; and a hose connection, comprising a second circumferential part cone-shaped surface. The system comprises a first centralizing ring having a third circumferential part cone-shaped surface engaging the first circumferential part cone-shaped surface of the quick connect nipple or the quick connect coupling; and a second centralizing ring having a surface engaging with the second circumferential part cone-shaped surface of the hose connection. The system comprises a spring forcing the third circumferential part cone-shaped surface of the first centralizing ring and the first circumferential part cone-shaped surface of the quick connect nipple, or the quick connect coupling, against each other, and forcing the surface of the second centralizing ring and the second circumferential part cone-shaped surface of the hose connection against each other.

According to one embodiment, a method for centralizing a quick connect nipple or coupling according to any one of the embodiments of the system is disclosed. The method comprises the spring forcing the quick connect nipple, or the quick connect coupling, to align with the first centralizing ring and the centralizing ring.

According to one embodiment, the second circumferential part cone-shaped surface of the hose connection may be a separate part of the hose connection and made out of thermoplastic polyethylene, and/or the first circumferential part cone-shaped surface of the quick connect nipple, or the quick connect coupling, may be a separate part of the quick connect nipple, or the quick connect coupling, respectively, and made out of thermoplastic polyethylene. These two may be configured as separate rings that may be attached to the hose connection, and one of the quick connect nipple and the quick connect coupling.

According to one embodiment, a method of assembling the system according to any one of the embodiments disclosed herein is disclosed. The method comprises snap-fitting the second circumferential part cone-shaped surface of the hose connection to the hose connection as a step for assembling the system.

According to at least one embodiment, a system and method centralizing a quick connect nipple or a quick connect coupling. Embodiments of the system and method work together with already existing nipples and couplings. The system is not expensive to produce. At least one embodiment avoids cumbersome arrangements that are expensive to manufacture or difficult or time consuming to assemble.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any other claimed embodiment or embodiments.

BRIEF DESCRIPTION OF THE DRAWINGS

The accompanying drawings illustrate presently exemplary embodiments of the disclosure and serve to explain, by way of example, the principles of the disclosure.

DETAILED DESCRIPTION

Figure 1:
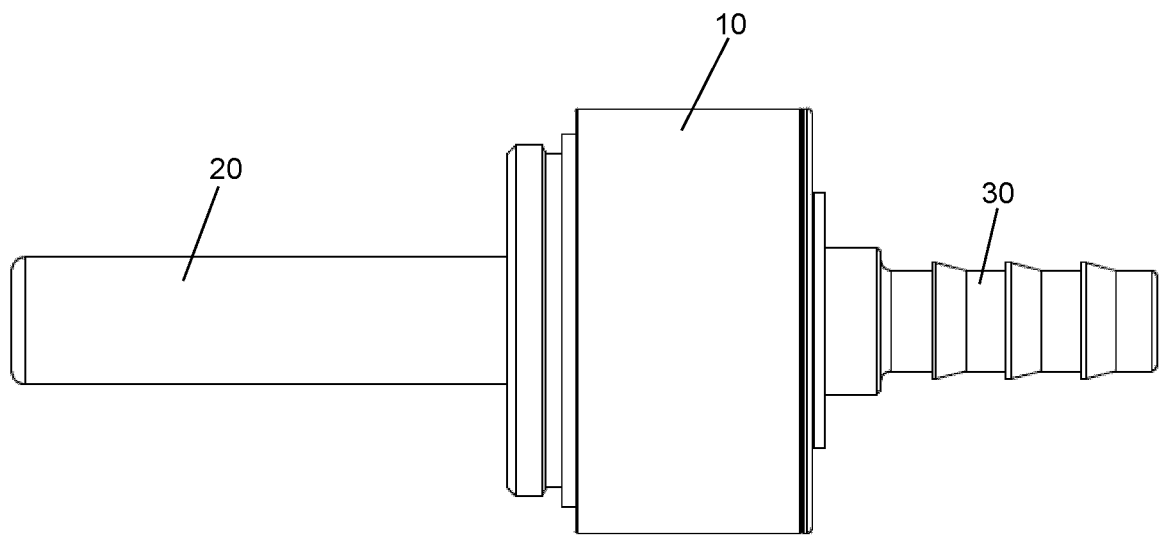
FIG. 1 is a diagrammatic illustration of a system according to an exemplary embodiment of the disclosure.
Figure 2:
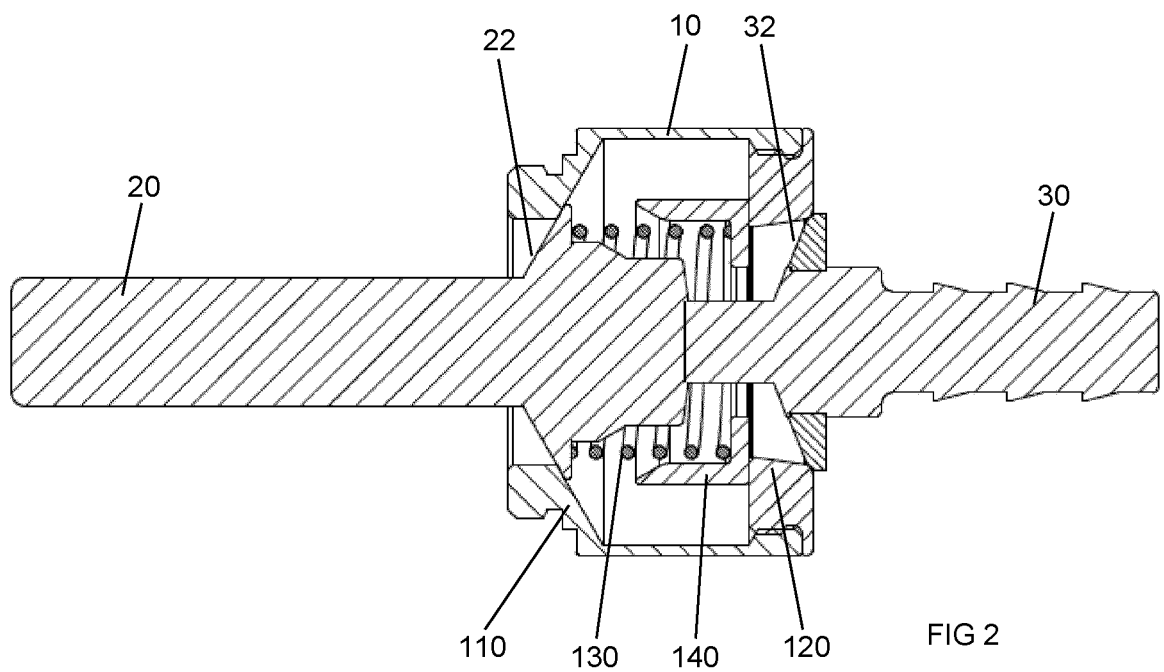
FIG. 2 is a diagrammatic illustration of the system, along a cut along the centre of the system in FIG. 1 according to an exemplary embodiment of the disclosure.
Figure 3:
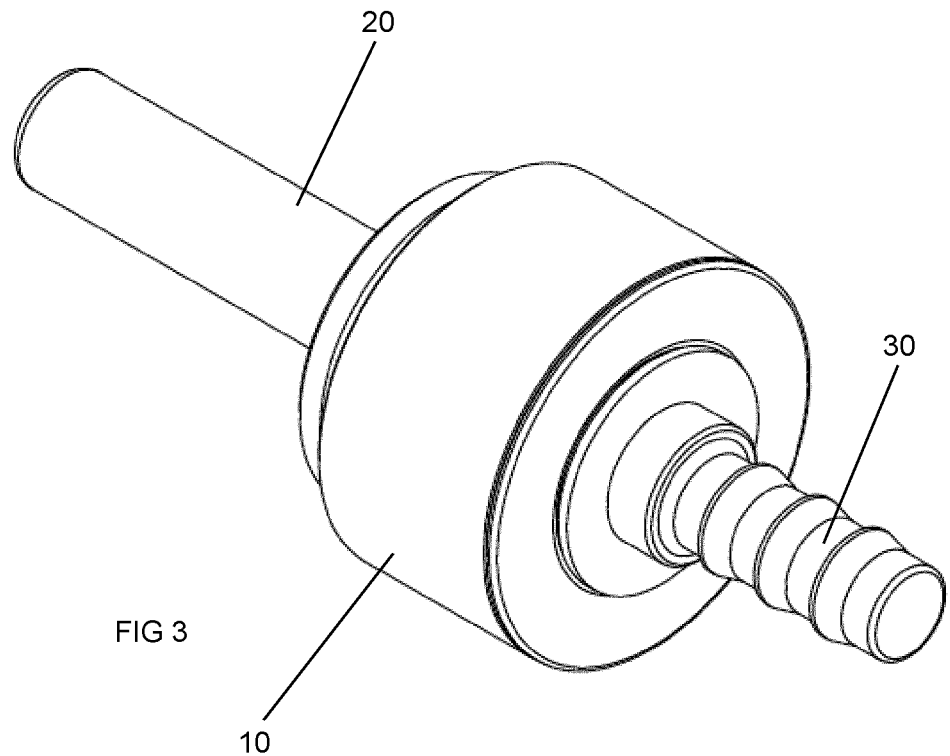
FIG. 3 is a diagrammatic illustration of the system in FIG. 1 according to an exemplary embodiment of the disclosure.
Figure 4:
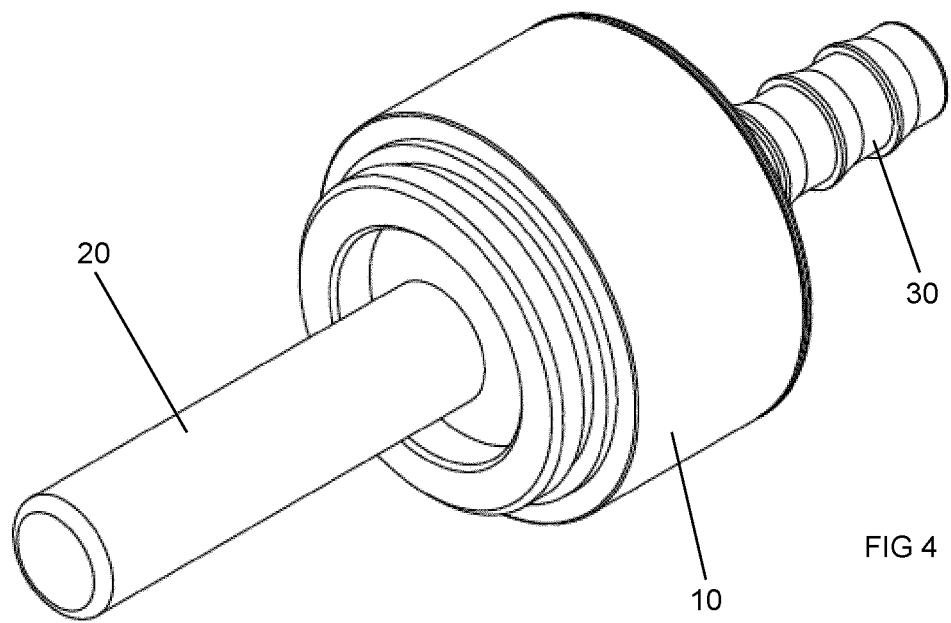
FIG. 4 is a diagrammatic illustration of the system in FIG. 1 according to an exemplary embodiment of the disclosure.
Figure 5:
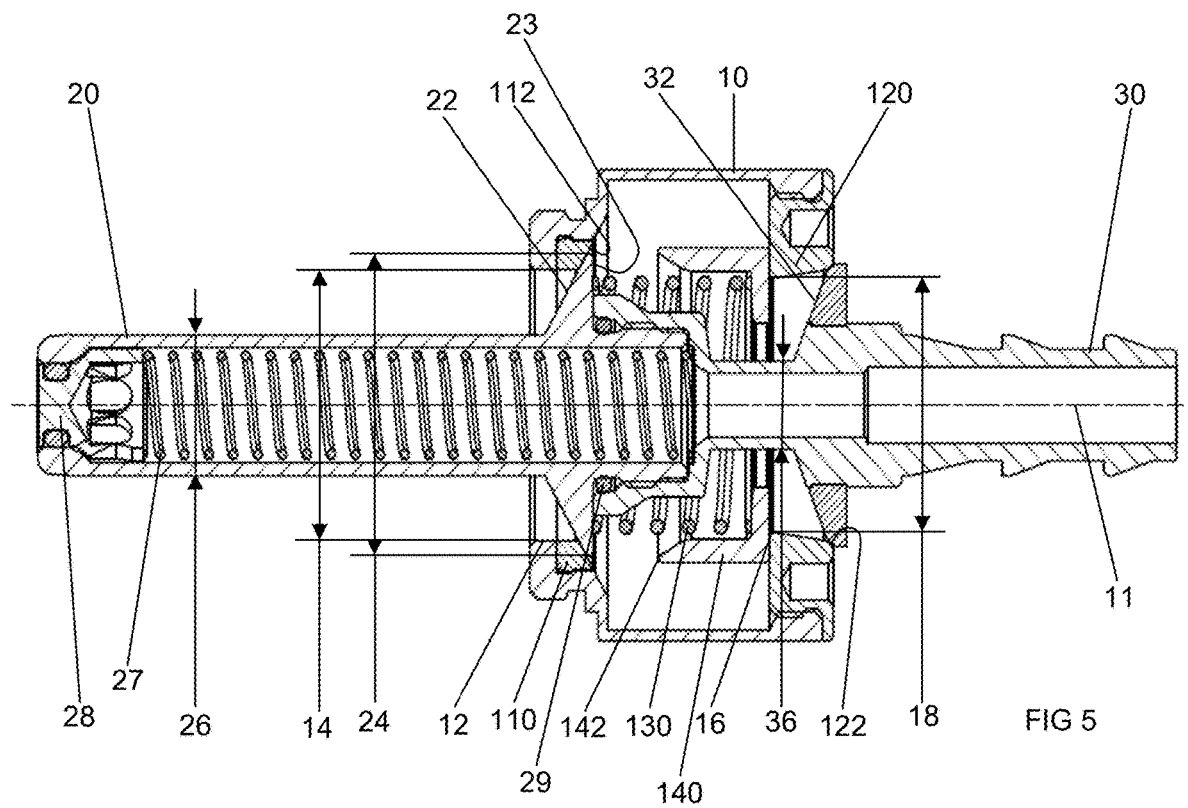
FIG. 5 is a diagrammatic illustration of a system according to an exemplary embodiment of the disclosure.
Figure 6:
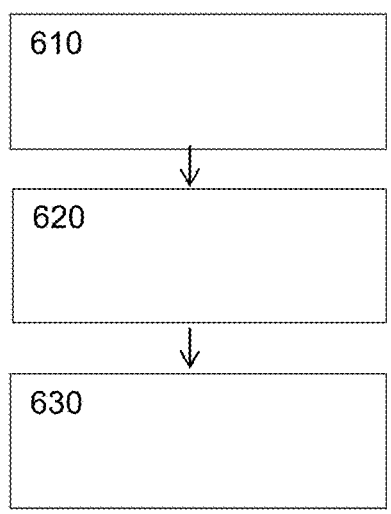
FIG. 6 is a diagrammatic illustration of a method according to an exemplary embodiment of the disclosure.
Figure 7:
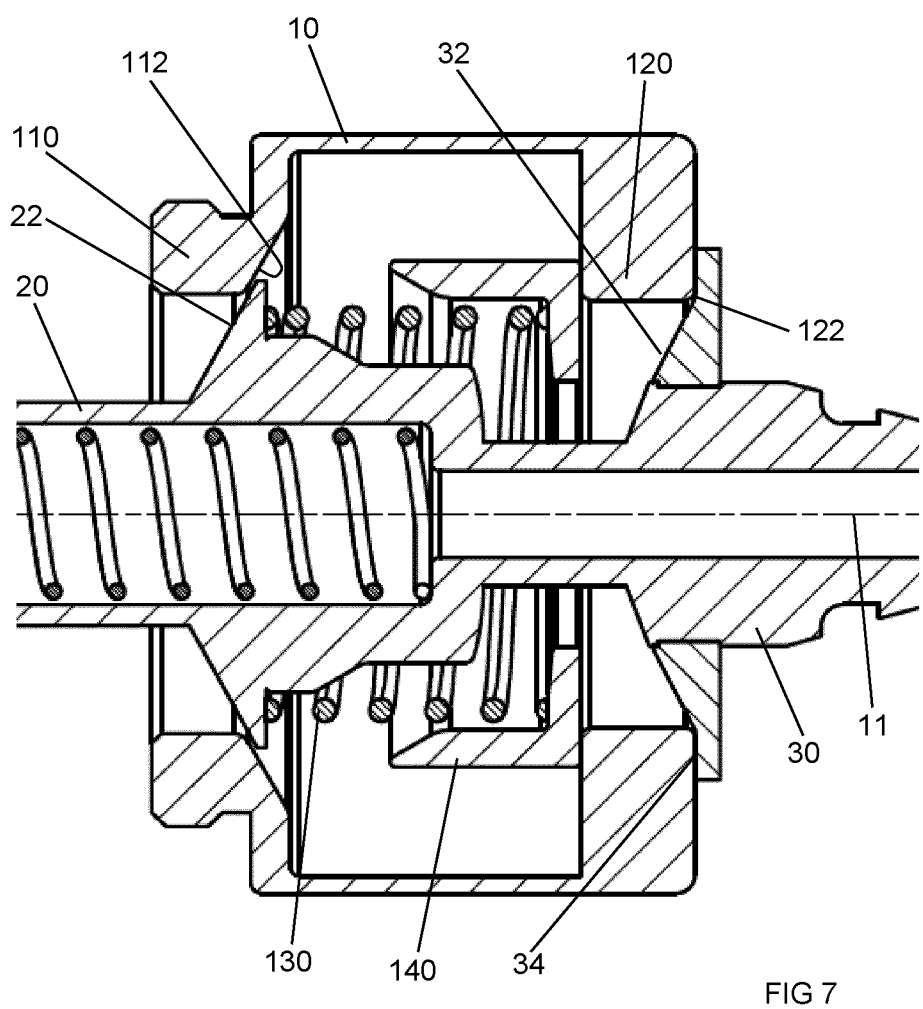
FIG. 7 is a diagrammatic illustration of a system according to an exemplary embodiment of the disclosure.
Figure 8:
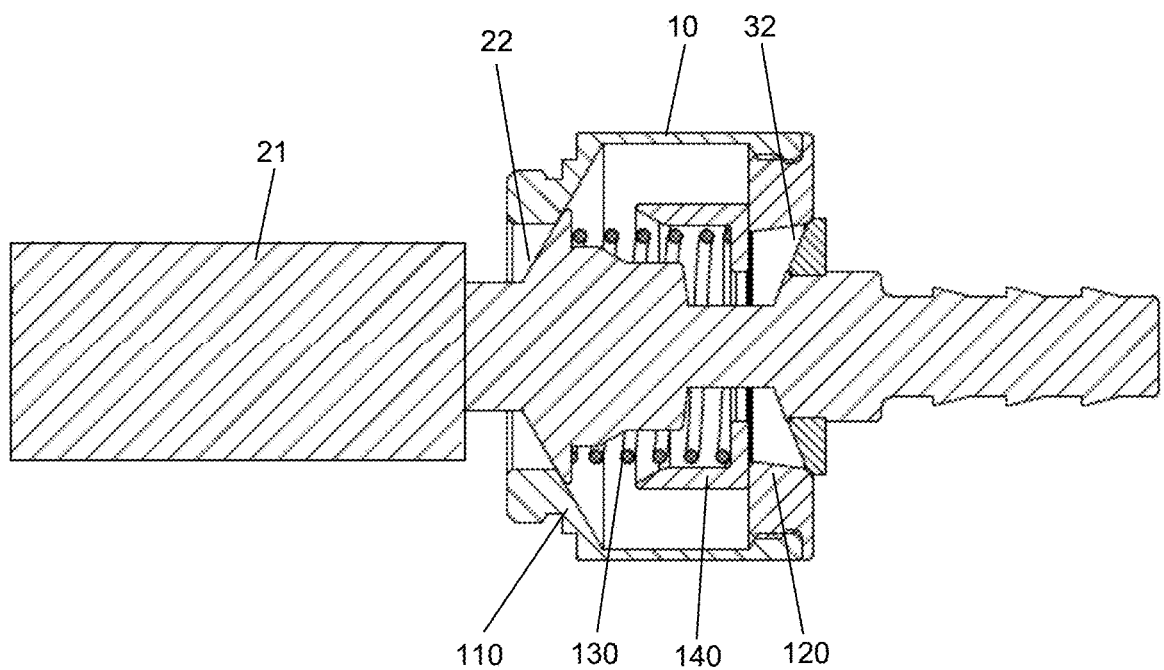
FIG. 8 is a diagrammatic illustration of a system according to an exemplary embodiment of the disclosure.

FIG. 1 shows an example embodiment of the system, and FIG. 2 shows the example embodiment of the system along a cut through the central axis of the system. However, in FIG. 2 the central through opening is not illustrated. FIGS. 3 and 4 show an example embodiment of the system. FIGS. 5, 7, and 8 show the system along a cut through the central axis of the system. FIG. 6 is a flow diagram of the method. The nipple is the male part of a connector and the coupling is the female part of the connector. The nipples and the couplings described herein may be quick connect nipples and quick connect couplings.

FIGS. 1-5 and 7 show a system for centralizing a quick connect nipple 20. The quick connect nipple 20 may instead be a quick connect coupling 21, as shown in FIG. 8. The system comprises a housing 10 and a quick connect nipple 20 and hose connection 30, or the system comprises a housing 10 and a quick connect coupling 21 and hose connection 30. These four parts may each be separate parts from each other. The may be made out of metal or polymers. The hose connection 30 may be for connecting a hose for fluid, for example air. The housing 10 may be connectable to a structure, such as a manifold or rack or further housing.

The quick connect nipple 20, or the quick connect coupling 21, each comprises a first circumferential part cone-shaped surface 22. The first circumferential part cone-shaped surface 22 is substantially extending perpendicular to the axis 11 of the quick connect nipple 20, or coupling 21, and forms an acute angle with the axis, with the angle opening towards the centre of the housing 10. The angle may be 50 to 85 degrees. The first circumferential part cone-shaped surface 22 may be a separate part of the quick connect nipple 20, or the quick connect coupling 21, respectively, and made out of thermoplastic polyethylene. as a separate part it may be configured in a ring form with a straight side, perpendicular to the axis of the nipple 20, and the cone-shaped surface 22 opposite the straight side. This is best illustrated in FIG. 7.

The hose connection 30 comprises a second circumferential part cone-shaped surface 32. The second circumferential part cone-shaped surface 32 is substantially extending perpendicular to the axis 11 of the hose connection 30 and forms an acute angle with the axis, with the angle opening away from the centre of the housing 10. The angle may be 50 to 85 degrees. The first circumferential part cone-shaped surface 22 and the second circumferential part cone-shaped surface 32 may both have the identical angle to the common axis 11 of the quick connect nipple 20, or coupling 21, and the hose connection 30.

The system further comprises a first centralizing ring 110 having a third circumferential part cone-shaped surface 112 engaging the first circumferential part cone-shaped surface 22 of the quick connect nipple 20, or the quick connect coupling 21; and a second centralizing ring 120 having a surface 122 engaging with the second circumferential part cone-shaped surface 32 of the hose connection 30. The third circumferential part cone-shaped surface 112 may be complementary to first circumferential part cone-shaped surface 22 by angle.

The system further comprises a spring 130 forcing the third circumferential part cone-shaped surface 112 of the first centralizing ring 110 and the first circumferential part cone-shaped surface 22 of the quick connect nipple 20, or the quick connect coupling 21, against each other, and forcing the surface 122 of the second centralizing ring 120 and the second circumferential part cone-shaped surface 32 of the hose connection 30 against each other. The first circumferential part cone-shaped surface 22 is in contact with the third circumferential part cone-shaped surface 122 of the housing 10. The second circumferential part cone-shaped surface 32 is in contact with the surface 122 of the housing 10. By the shape of the first circumferential part cone-shaped surface 22 and the spring force from the spring 130 forcing the first circumferential part cone-shaped surface 22 against the third circumferential part cone-shaped surface 112, the first circumferential part cone-shaped surface 22 may slide and move towards a position that aligns the axis 11 of the quick connect nipple 10 with the axis 11 of the housing. By the shape of the second circumferential part cone-shaped surface 32 and the spring force from the spring 130 forcing the second circumferential part cone-shaped surface 32 against the surface 122, the second circumferential part cone-shaped surface 32 may slide and move towards a position that aligns the axis 11 of the hose connection 30 with the axis 11 of the housing. Hereby the quick connect nipple 20, or the quick connect coupling 21, and the hose connection 30 may align with the axis 11 of the housing 10. For example, if a connection is made with the quick connect nipple 20 that misaligns the axis of the quick connect nipple 20 during the connection, then when a disconnection is made the quick connect nipple 20 aligns with the axis 11 of the housing 10.

According to one embodiment, the housing 10 may comprise a first opening 12, with a first diameter 14, and a second opening 16, with a second diameter 18. The quick connect nipple 20, or the quick connect coupling 21, may protrude through the first opening 12 and the hose connection 30 may protrude through the second opening 16. In this way, the quick connect nipple 20, or the quick connect coupling 21, may be accessible on one side of the housing 10, and the hose connection 30 may be accessible on an opposite side of the housing 10.

According to one embodiment, the quick connect nipple 20, or the quick connect coupling 21, the hose connection 30, the first opening 12, the second opening 16, the first centralizing ring 110, and the second centralizing ring 120 are all concentric. All these may share the same central axis 11, as may best be taken from FIG. 5. The first, second, and third circumferential part cone-shaped surfaces 22, 32, 112 may also be concentric with all these, and may also share the same central axis 11. They all may share the same axis 11 when aligned, but naturally not when misaligned.

According to one embodiment, the first diameter 14 may be about one and a half to three times a diameter 26 of the protruding quick connect nipple 20, or of the quick connect coupling 21, passing through the first opening 12. The first diameter 14 may be about two times the diameter 26 of the protruding quick connect nipple 20, or of the quick connect coupling 21, passing through the first opening 12. According to one embodiment, the second diameter 18 may be about one and a half to three times the diameter 36 of the hose connection 30 inside the housing 10 passing through the second opening 16. The second diameter 18 may be about two times the diameter 36 of the hose connection 30 inside the housing 10 passing through the second opening 16.

According to one embodiment, a first outer diameter 24 of the circumferential part cone-shaped surface 22 may be two to four times an outer diameter 26 of the quick connect nipple 20, or the quick connect coupling 21, passing through the first opening 12. The first outer diameter 24 of the circumferential part cone-shaped surface 22 may be one to three times the outer diameter 26 of the quick connect nipple 20, or the quick connect coupling 21, passing through the first opening 12. In examples, only the outer part (e.g., only a sixth of the circumferential part cone-shaped surface 22) may contact the third circumferential part cone-shaped surface 112 of the first guiding ring 110, when the circumferential part cone-shaped surface 22 extends from the quick connect nipple 20, or a quick connect coupling 21.

According to one embodiment, the second circumferential part cone-shaped surface 32 may be snap fitted to the hose connection 30. The second circumferential part cone-shaped surface 32 may be made out of a different material as the hose connection 30. The second circumferential part cone-shaped surface 32 may be a separate element in the substantial form of a ring with the second circumferential part cone-shaped surface 32. This ring may be snap fitted onto and around the hose connection 30.

According to one embodiment, the spring 130 may be entirely within the housing 10, and may act between the housing 10 and the quick connect nipple 20, or the quick connect coupling 21, or the hose connection 30. One end of the spring 130 may be against a part of the housing 10, and the other end of the spring 130 may be against a part of the quick connect nipple 20, or the quick connect coupling 21, or the first circumferential part cone-shaped surface 22, and provide a spring force forcing them apart. The spring 130 may act between the back of the first circumferential part cone-shaped surface 22 of the quick connect nipple 20, or the quick connect coupling 21, and an inside of the housing 10, or a rear sleeve 140. The rear sleeve 140 may be as mentioned herein.

According to one embodiment, the quick connect nipple 20, or the quick connect coupling 21, and the hose connection 30 may be separate elements connectable to each other. The connection of the quick connect nipple 20, or the quick connect coupling 21, and the hose connection 30 may be made entirely inside the housing 10. According to one embodiment, the quick connect nipple 20, or the quick connect coupling 21, and the hose connection 30 may be connected to each other by a screw connection. The connection may comprise a sealing element 29, for example an o-ring, between the quick connect nipple 20, or the quick connect coupling 21, and the hose connection 30. The sealing element 29 may seal the fluid flow through the system.

According to one embodiment, the quick connect nipple 20, or the quick connect coupling 21, may be for air. According to one embodiment, the system may be for air or a cooling fluid or a cooling liquid. According to one embodiment the system may be mounted in a rack and providing connection for a cooling fluid.

According to one embodiment, and as illustrated best in FIG. 7, the second circumferential part cone-shaped surface 32 of the hose connection 30 may comprise an additional flange 34 extending circumferential and perpendicular to an axis 11 of the quick connect nipple 20, or the quick connect coupling 21. This flange 34 may prevent foreign objects to enter inside the housing 10. This flange 34 may position the quick connect nipple 20, or the quick connect coupling 21, in an axial position. The flange 34 may start to extend radially from where the surface 122 ends and continue to extend for half the radial distance of the second circumferential part cone-shaped surface 32, for example about 4 to 7 millimetres.

According to one embodiment, the surface 122 may comprise a rounded corner 122 or a fourth circumferential part cone-shaped surface, for engaging with the second circumferential part cone-shaped surface 32 of the hose connection 30. The second circumferential part cone-shaped surface 32 may engage an edge of the housing 10.

According to one embodiment, the system may further comprise a rear sleeve 140 in which the spring 130 is positioned. The rear sleeve 140 may be arranged at least partly cylindrically around the spring, and an end 142 of the rear sleeve 140 may be configured to engage on an opposite side 23 of the first circumferential part cone-shaped surface 22 when the quick connect nipple 20 is pushed inwards into the housing 10. An opposite end of the rear sleeve may be configures to engage an inside of the housing 10. Thus, when the nipple 20 in FIG. 5 is pushed towards the right, then the rear sleeve 140 may stop the nipple when the nipple 20 engages the rear sleeve. In this way, even if the system is assembled and kept together by the snap fit, an outer force on the nipple can be taken up by the system without damaging the system. When a force pushes on the quick connect nipple 20 harder than the spring force of the spring 130, then the end 142 of the rear sleeve 140 may contact directly on the opposite side 23 of the first circumferential part cone-shaped surface 22 of the quick connect nipple 20, or the quick connect coupling 21. When the push force is released, or the no force is acting on the nipple, then the quick connect nipple 20 re-centres, aligns, itself with respect to the housing 10. The axis of the nipple becomes concentric with the axis 11 of the housing. According to one embodiment, the connection, for example the screw connection, between the quick connect nipple 20, or the quick connect coupling 21, and the hose connection 30 fits inside the spring 130. In this regard, please see FIG. 5.

According to one embodiment, the first centralizing ring 110 may be a separate part of the housing 30 and made out of thermoplastic polyethylene, ultra-high-molecular-weight polyethylene (UHMWPE, UHMW) UHPE. According to one embodiment, the second centralizing ring 120 may be an integral part of the housing 30 and may be made out of metal. The metal may be steel. According to one embodiment, the first circumferential part cone-shaped surface 22 of the quick connect nipple 20, or the quick connect coupling 21, may be an integral part of the quick connect nipple 20, or the quick connect coupling 21, respectively, and may be made out of metal, for example steel. According to one embodiment, the second circumferential part cone-shaped surface 32 of the hose connection 30 may be a separate part of the hose connection 30 and made out of thermoplastic polyethylene, ultra-high-molecular-weight polyethylene (UHMWPE, UHMW) UHPE.

According to one embodiment, the first circumferential part cone-shaped surface 22 of the quick connect nipple 20, or the quick connect coupling 21, may be a separate part of the quick connect nipple 20, or the quick connect coupling 21, respectively, and may be made out of thermoplastic polyethylene, ultra-high-molecular-weight polyethylene, UHMWPE. The first circumferential part cone-shaped surface 22 may be part of a separate ring that is clamped directly between a radial protrusion of the quick connect nipple 20, or of the quick connect coupling 21, and an axial end of the hose connection 30. FIG. 7 illustrates the first circumferential part cone-shaped surface 22 as an integral part of the quick connect nipple 20, or the quick connect coupling 21, on the lower side. FIG. 7 illustrates the first circumferential part cone-shaped surface 22 as a separate part of the quick connect nipple 20, or the quick connect coupling 21, on the upper side in FIG. 7.

According to one embodiment, at least one of the first centralizing ring 110 and the second centralizing ring 120 is an integral part of the housing 10. A surface of the housing 10 may act as the first centralizing ring 110 and/or the second centralizing ring 120.

According to one embodiment, the hose connection 30 may hold a valve spring 27 acting on a valve element 28 of the quick connect nipple 20. The valve spring 27 may be acting between, forcing apart, the valve element 28 and the hose connection 30.

According to one embodiment, a method for centralizing a quick connect nipple or coupling according to the system according to any one of the preceding embodiments is disclosed. The spring 130 forces the quick connect nipple 20, or the quick connect coupling 21, to align with the first centralizing ring 110 and the centralizing ring 120. This way of centralizing, using two centralizing rings achieves a better and more reliable alignment of the nipple within the housing. The double re-centralizing better aligns and re-centres the nipple so that the quick connect nipple 20 comes back to the central axis 11 after being misaligned or moved. According to one embodiment, any embodiment of the system disclosed herein may be used for cooling computer equipment.

According to one embodiment, a method of assembling the system according to any one of the embodiments disclosed herein is disclosed. The method comprises 610 snap-fitting the second circumferential part cone-shaped surface 32 of the hose connection 30 to the hose connection 30 as a step for assembling the system. In this way an easy, quick, and reliable assembly is established, that also allows pressure testing the quick connect nipple before the system is finally assembled. In a similar way, or alternatively, the first circumferential part cone-shaped surface 22 of the quick connect nipple 20, or the quick connect coupling 21, may be fitted, or snap-fitted, to the quick connect nipple 20, or the quick connect coupling 21, respectively, as a step for assembling the system according to any one of the embodiments disclosed herein is disclosed. This may be done as a first initial step. The first circumferential part cone-shaped surface 22 may be part of a separate ring that is clamped directly between a radial protrusion of the quick connect nipple 20, or of the quick connect coupling 21, and an axial end of the hose connection 30.

According to one embodiment, the step of snap-fitting the circumferential part cone-shaped surface 32 to the hose connection 30 may be the last step in the method of assembling and no other means are used to attach the circumferential part cone-shaped surface 32 to the hose connection 30. No other means may be used for holding and positioning the circumferential part cone-shaped surface 32 to the hose connection 30. The step of snap-fitting the circumferential wedge-shaped surface 32 to the hose connection 30 may be done after connecting the quick connect nipple 20, or the quick connect coupling 21, with the hose connection 30. According to one embodiment, the method of assembling the system may further comprise pressing, snap-fitting, the first centralizing ring 110 into the housing 10, no other means may be used for holding and positioning the first centralizing ring 110.

According to one embodiment, the method of assembling the system may further comprise 620 assembling, the quick connect nipple 20, or a quick connect coupling 21, with the hose connection 30, and 630 pressure test it before inserting it into the housing (30). For example, the quick connect nipple 20 may be screw connected with the hose connection 30, and then a pressure test of the nipple and hose connection can be made. Thereafter they both can be assembled into the housing 10. This ensures high quality and reliability, for example no leakage.

According to at least one embodiment disclosed herein, a technical effect is that the spring force acts onto the two circumferential part cone-shaped surfaces and this aligns the nipple in the housing after having been misaligned. The two circumferential part cone-shaped surfaces allow for a better, larger and easier and less friction, movement of the nipple to re-center after having taken up any misalignment between the nipple 20 and an external coupling 21. Thus, when a new connection is to be made the nipple 20 is aligned with the housing, but can move, is floating, to take up any misalignment during the connection process.

This written description uses examples to disclose the system and method for centralizing a quick connect nipple, and also to enable any person skilled in the art to practice the system, including making and using the adapters and performing the methods. Other examples may occur to those skilled in the art based on the present disclosure. Such other examples are intended to be within the scope of the present disclosure.

LIST OF ELEMENTS 10 housing
12 first opening
14 first diameter
16 second opening
18 second diameter
20 quick connect nipple
21 quick connect coupling
22 first circumferential part cone-shaped surface
23 opposite side
24 first outer diameter
26 outer diameter of nipple
27 valve spring
28 valve element
29 sealing element
30 hose connection
32 second circumferential part cone-shaped surface
34 additional flange
36 diameter of the hose connection
110 first centralizing ring
112 third circumferential part cone-shaped surface
120 second centralizing ring
122 surface
140 rear sleeve
142 end of rear sleeve
130 spring
610 to 630 method steps

The invention claimed is:

1. A system for centralizing a male quick connect nipple or a female quick connect coupling, the system comprising:
    a housing;
    the male quick connect nipple or the female quick connect coupling comprising a first circumferential part cone-shaped surface;
    a hose connection, comprising a second circumferential part cone-shaped surface;
    a first centralizing ring having a third circumferential part cone-shaped surface engaging the first circumferential part cone-shaped surface of the male quick connect nipple or the female quick connect coupling;
    a second centralizing ring having a surface engaging with the second circumferential part cone-shaped surface of the hose connection;
    a spring forcing the third circumferential part cone-shaped surface of the first centralizing ring and the first circumferential part cone-shaped surface of the male quick connect nipple or the female quick connect coupling, against each other, and forcing the surface of the second centralizing ring and the second circumferential part cone-shaped surface of the hose connection against each other; and
    a rear sleeve in which the spring is positioned, the rear sleeve being arranged at least partly cylindrically around the spring,
    wherein an end of the rear sleeve is configured to engage on an opposite side of the first circumferential part cone-shaped surface when the male quick connect nipple or the female quick connect coupling is pushed inwards into the housing.

2. The system according to claim 1, wherein the housing comprises a first opening with a first diameter and a second opening with a second diameter, the male quick connect nipple or the female quick connect coupling protruding through the first opening and the hose connection protruding through the second opening.

3. The system according to claim 2, wherein the male quick connect nipple or the female quick connect coupling, the hose connection, the first opening, the second opening, the first centralizing ring, and the second centralizing ring are all concentric.

4. The system according to claim 1, wherein the spring is entirely within the housing, and acts between one of the housing and the female quick connect coupling or the male quick connect nipple, or the hose connection.

5. The system according to claim 1, wherein the male quick connect nipple or the female quick connect coupling and the hose connection are separate elements connectable to each other.

6. The system according to claim 1, wherein the male quick connect nipple or the female quick connect coupling and the hose connection are connected to each other by a screw connection; and wherein the quick connect nipple or the quick connect coupling, is for air.

7. The system according to claim 1, wherein the second circumferential part cone-shaped surface of the hose connection comprises an additional flange extending circumferential and perpendicular to an axis of the male quick connect nipple or the female quick connect coupling.

8. The system according to claim 1, wherein the surface comprises a rounded corner or a fourth circumferential part cone-shaped surface, for engaging with the second circumferential part cone-shaped surface of the hose connection.

9. The system according to claim 1, wherein the first centralizing ring is a separate part of the housing and made out of thermoplastic polyethylene.

10. The system according to claim 1, wherein the first centralizing ring is an integral part of the housing.

11. The system according to claim 2, wherein the second centralizing ring is an integral part of the housing and made out of metal.

12. The system according to claim 1, wherein the first circumferential part cone-shaped surface of the male quick connect nipple or the female quick connect coupling is an integral part of the male quick connect nipple or the female quick connect coupling and made out of metal.

13. The system according to claim 1, wherein the second circumferential part cone-shaped surface of the hose connection is a separate part of the hose connection and made out of thermoplastic polyethylene.

14. The system according to claim 1, the first circumferential part cone-shaped surface of the male quick connect nipple or the female quick connect coupling is a separate part of the male quick connect nipple or the female quick connect coupling and made out of thermoplastic polyethylene.

15. The system according to claim 1, wherein at least one of the first centralizing ring and the second centralizing ring is an integral part of the housing.

16. The system according to claim 1, wherein the hose connection holds a valve spring acting on a valve element of the male quick connect nipple or the female quick connect coupling.

17. A system for centralizing a male quick connect nipple or a female quick connect coupling, the system comprising:
a housing;
the male quick connect nipple or the female quick connect coupling comprising a first circumferential part cone-shaped surface;
a hose connection, comprising a second circumferential part cone-shaped surface;
a first centralizing ring having a third circumferential part cone-shaped surface engaging the first circumferential part cone-shaped surface of the male quick connect nipple or the female quick connect coupling; a second centralizing ring having a surface engaging with the second circumferential part cone-shaped surface of the hose connection;
a spring forcing the third circumferential part cone-shaped surface of the first centralizing ring and the first circumferential part cone-shaped surface of the male quick connect nipple or the female quick connect coupling, against each other, and forcing the surface of the second centralizing ring and the second circumferential part cone-shaped surface of the hose connection against each other;
wherein at least one of the first centralizing ring or the second centralizing ring is an integral part of the housing.

18. The system according to claim 17, wherein the housing comprises a first opening with a first diameter and a second opening with a second diameter, the male quick connect nipple or the female quick connect coupling protruding through the first opening and the hose connection protruding through the second opening.

19. The system according to claim 18, wherein the male quick connect nipple or the female quick connect coupling, the hose connection, the first opening, the second opening, the first centralizing ring, and the second centralizing ring are all concentric.

20. The system according to claim 17, wherein the spring is entirely within the housing, and acts between one of the housing and the male quick connect nipple or the female quick connect coupling, or the hose connection.

* * * * *